United States Patent [19]

Nielsen

[11] Patent Number: 5,174,889
[45] Date of Patent: Dec. 29, 1992

[54] ATOMIZING FEED FOR CRACKING UNIT

[75] Inventor: Richard H. Nielsen, Ashland, Ky.

[73] Assignee: Phillips Petroleum Company, Bartlesville, Okla.

[21] Appl. No.: 463,175

[22] Filed: Jan. 10, 1990

Related U.S. Application Data

[60] Continuation-in-part of Ser. No. 252,399, Sep. 30, 1988, abandoned, which is a division of Ser. No. 539,437, Oct. 6, 1983, abandoned.

[51] Int. Cl.$^5$ .............................................. C10G 11/18
[52] U.S. Cl. ................................. 208/113; 208/153; 208/157; 439/422
[58] Field of Search ............... 208/157, 113; 239/398, 239/416.1, 416.4, 421, 423, 424, 426, 434

[56] References Cited

U.S. PATENT DOCUMENTS

| | | | |
|---|---|---|---|
| 535,000 | 3/1895 | Goodman | 239/426 |
| 1,169,433 | 1/1916 | Shelley | 239/423 |
| 1,321,816 | 11/1919 | Foerst | 239/423 |
| 3,622,080 | 11/1971 | Cliviger | 239/426 |
| 3,654,140 | 4/1972 | Griffel et al. | 208/113 |
| 3,702,175 | 11/1972 | Watkins | 239/422 |
| 4,534,851 | 8/1985 | Allan et al. | 208/48 R |
| 4,555,328 | 11/1985 | Krambeck et al. | 208/157 |
| 4,578,183 | 3/1986 | Chou et al. | 208/113 |
| 4,729,825 | 3/1988 | Nielsen | 208/154 |
| 4,793,913 | 12/1988 | Chessmore et al. | 208/113 |

OTHER PUBLICATIONS

Marshall, R.A.C.B.I., "Atomization & Spray Drying", AICHE-CEP Monograph Series 50(2); pp. 46–47, 1954.

*Primary Examiner*—Anthony McFarlane
*Attorney, Agent, or Firm*—George E. Bogatie

[57] ABSTRACT

A method for introducing a heavy oil feedstock into a catalytic cracking unit is disclosed which comprises forming the oil feed into a sheet of flowing fluid and breaking down the sheet of oil by mixing the oil with a sheet of atomizing gas flowing normally to the sheet of oil.

6 Claims, 3 Drawing Sheets

ATOMIZING FEED FOR CRACKING UNIT

CROSS REFERENCE TO RELATED APPLICATION

This application is a continuation-in-part of copending application Ser. No. 07/252,399 filed Sep. 30, 1988, now abandoned, which is a divisional of application Ser. No. 07/539,437 filed Oct. 6, 1983, now abandoned.

BACKGROUND OF THE INVENTION

This invention relates to improving catalytic cracking operations for hydrocarbon-containing oils. In one aspect, the invention relates to an oil nozzle for a catalytic cracking unit. In another aspect the invention relates to a method for atomizing the feed to a catalytic cracking unit.

Catalytic cracking is one attractive method for upgrading heavy liquid hydrocarbon feedstocks to gasoline and other valuable products. Such catalytic cracking upgrading operations, however, have not always been completely satisfactory. In the cracking of heavy residual oils, for example, the depositing of large amounts of carbonaceous material, commonly referred to as coke, around the feed inlet can interfere with injecting the oil feed into the unit for contact with the cracking catalyst. Further difficulties are encountered in the catalytic cracking of slurry oils which contain catalyst particles where the nozzle can be eroded by contact with the flowing catalyst particles.

Rapid vaporization of the oil feed is critical for satisfactory operation of the cracking unit. Heavy oils and residual fractions are difficult to satisfactorily vaporize even when the injection equipment is functioning perfectly, and nozzle coking or erosion in such a manner that interferes with vaporization of the oil feed is clearly undesirable.

It is an object of this invention to provide a nozzle suitable for use in a catalytic cracking unit which provides good atomization of a heavy oil feed.

It is another object of this invention to provide an oil nozzle for a catalytic cracking unit which can be retractably positioned in the unit so that it is easily removed for maintenance, repair or replacement.

It is a further object of this invention to provide an oil nozzle for use in a catalytic cracking unit in which the oil spray is discharged parallel to the longitudinal axis of the nozzle.

It is another object of this invention to provide an oil nozzle for a catalytic cracking unit which is highly resistant to erosion damage and fouling by coking.

It is still another object of this invention to provide a method for atomizing an oil feedstock which mitigates eddy currents at the discharge end of the nozzle which can cause nozzle fouling or plugging by coke deposits and erosion damage.

SUMMARY OF THE INVENTION

In one aspect, a feedstock nozzle is provided which comprises an inner tubular member and an outer tubular member, wherein the two tubular members are coaxially arranged. The outer tubular member of the feedstock nozzle is positioned outside the inner tubular member with an annular flow path being defined in the space between the two tubular members.

An end closure, having a slot therethrough so as to discharge fluid along the longitudinal axis of the nozzle, is provided for the inner tubular member, and an outer tube end closure, having a sidewall which protrudes past the inner tube end closure is provided for the outer tubular member. The sidewall of the outer tube end closure has a slot therethrough so as to discharge fluid along the radius of the nozzle. The sidewall of the outer tube end closure further includes a protruding ridge, or so called lip, for extending the sidewall. The lip is positioned in a plane with the sidewall so as to contact fluid which is discharged from the feedstock nozzle so as to flow across the sidewall.

In another aspect, the invention relates to a method for injecting an oil feedstream into a fluid catalytic cracking unit, wherein the oil feedstream enters the cracking unit through an annular flow path which encloses a stream of atomizing gas. Both the oil feedstream and the atomizing gas stream, which are supplied to the cracking unit, are formed into sheets by flowing through separate slots in the end closures of the feedstock nozzle. The oil and the atomizing gas are then mixed by breaking down the sheet of oil which flows in a radial direction from the feedstock nozzle. The radially flowing sheet of oil is broken down by being cut or sheared with the sheet of atomizing gas which flown in an axial direction. In this manner a mixture of oil droplets in the atomizing gas is injected into the fluid catalytic cracking unit.

DETAILED DESCRIPTION OF THE INVENTION

Figure 1:
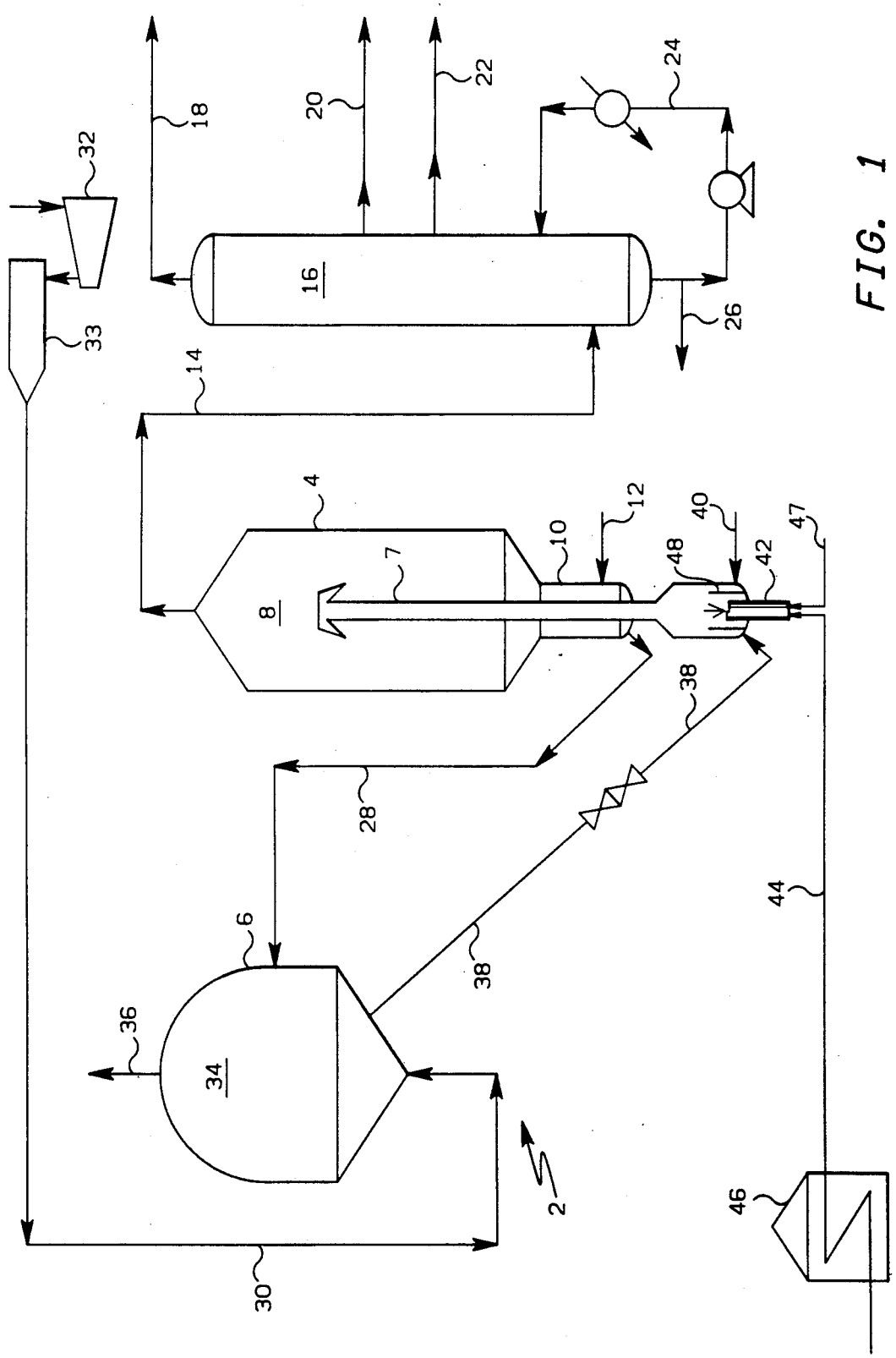
FIG. 1 is a simplified schematic of one type of fluid catalytic cracking unit.

Referring to FIG. 1, one type of catalytic cracking unit generally indicated at 2 comprises a reactor section 4 and a regenerator section 6. The reactor section 4 comprises a riser-reactor 7, a catalyst/product separation zone 8, which usually contains several cyclone separators, not illustrated, and a stripping zone 10. Overhead product from the separation zone 8 is conveyed via line 14 to separation zone 16 which comprises one or more fractionators and serves to separate the overhead product stream flowing in line 14 into various fractions, for example, light hydrocarbon gases which are withdrawn from the zone 16 via the line 18, gasoline range liquids which are withdrawn via line 20, distillates which are withdrawn via line 22, and slurry oils, cycle oils, unreacted feed and the like which can be recycled through line 24 and/or withdrawn via line 26 for further processing.

The cracking process produces carbon (coke) which deposits on the catalyst particles and rapidly lowers catalyst activity. Used or so called "spent" catalyst, which includes carbon deposits, is therefore withdrawn from the reactor 4 through the stripping zone 10 where a stripping gas, usually steam, strips entrained hydrocarbons from the spent catalyst. After being stripped in the zone 10, the cracking catalyst is conveyed from the stripping zone 10 to the regenerator 6 via line 28. In the regenerator 6, oxygen containing gas is introduced into the regenerator via line 30 which is connected to a source of oxygen containing gas supplied through air compressor 32 and air heater 33. Carbonaceous deposits are burned from the catalyst in the regenerator 6 thus forming a flue gas which generally contains catalyst particles. The flue gas is separated from the catalyst particles in a separation zone 34 of the regenerator 6, which usually contains a plurality of cyclone separators. The flue gas is withdrawn from the regenerator 6 via the line 36. Hot regenerated catalyst passes from the regenerator 6 to the riser-reactor 7 via line 38.

In the lower portion of the riser-reactor 7, catalyst supplied through line 38 is fluidized with a gas, usually steam introduced into the riser-reactor 7 via line 40. The oil feedstock is introduced into the riser 7 through a nozzle 42 via line 44 which is connected to a suitable source of oil feedstock. A preheater 46 associated with the line 44 serves to preheat the oil feedstock to a desired temperature. Steam or other gas from a suitable source is introduced into the nozzle 42 via line 47 to atomize the oil feedstock. A tube or sheath 48 is preferably positioned about the nozzle 42 in the bottom of the riser-reactor 7 to protect the nozzle 42 from contact with the circulating hot cracking catalyst supplied through line 38.

The conditions in the riser-reactor 7 and regenerator 6 are well known to those of ordinary skill in petroleum refining art. Usually, the temperature in the riser-reactor 7 will be in the range of from about 850° to about 1050° F. The oil feedstock is usually admixed with steam at a weight ratio of oil to steam of in the range of about 10:1 to about 25:1. A catalyst to oil weight ratio employed in the riser-reactor 7 is generally in the range from about 3:1 to about 30:1, usually between about 3:1 and about 12:1. Pressure in the riser-reactor 7 is usually between about 15 and about 60 psia. The cracking catalyst particles generally have a size in the range of from about 20 to about 200 microns, usually between about 40 and 80 microns. Flow velocity upward in the vertical section of the riser-reactor is generally up to between about 40 and about 90 feet per second at the top of the riser. The contact time between the catalyst and oil in the riser-reactor is generally in the range of from about 1 to about 4 seconds, usually from about 1.5 to about 3 seconds. The regenerator is normally operated at a temperature in the range of from about 1100° to about 1500° F. and is ordinarily provided with sufficient oxygen-containing gas to reduce the coke on the catalyst to a level of about 0.5 weight percent or less, preferably less than 0.1 weight percent.

Catalysts suitable for catalytic cracking include silica alumina or silica magnesia synthetic microspheres or ground gels and various natural clay type or synthetic gel-type catalysts. Most preferably, fluidizable zeolite-containing cracking catalysts are employed.

The present invention has its greatest advantage in cracking oil feeds, especially catalytically cracking heavy petroleum fractions. Typical feedstocks are light and heavy gas oils obtained by primary distillation, vacuum distillation, and the like from crude oils of various sources. Recycled oils from a previous cracking step can also be further refined. The boiling range of the feedstock is usually between about 450° and about 650° for light gas oils, 650° to 850° F. for medium gas oils and about 850° to 1050° and higher for heavy gas oils, cycle oils, and residuum.

Figure 2:
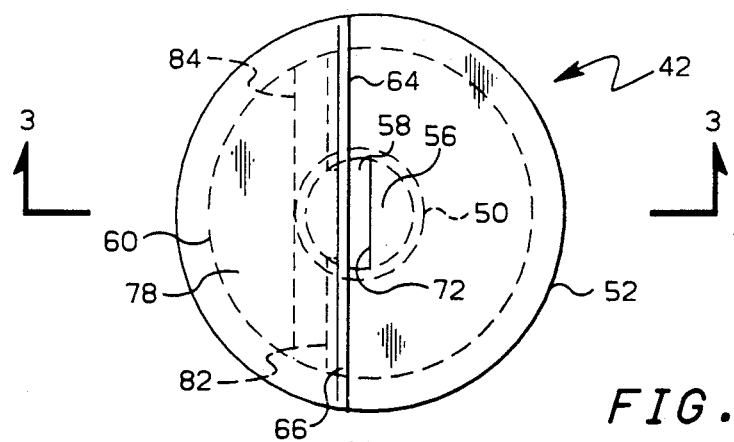
FIG. 2 is a plan representation of a nozzle usefully employed in the system of FIG. 1.
Figure 3:
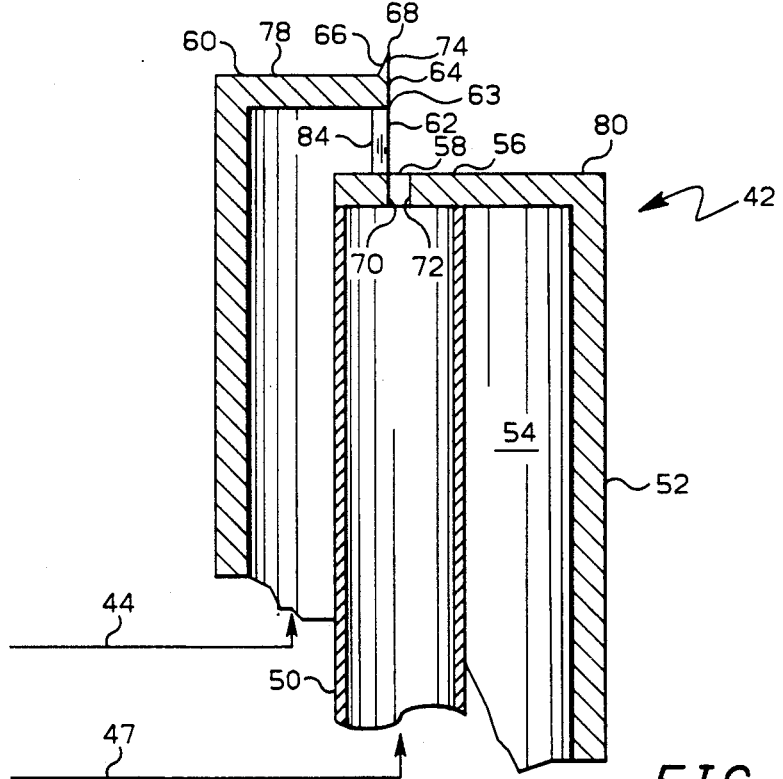
FIG. 3 is a cross-sectional view of the nozzle of FIG. 2 when viewed along lines 3—3.
Figure 4:
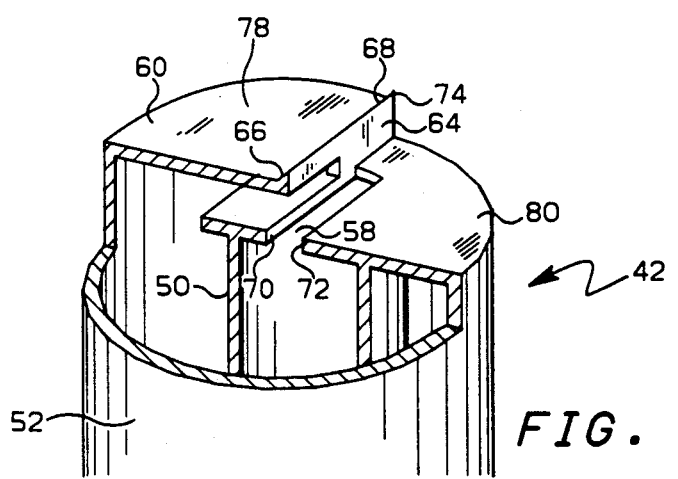
FIG. 4 is a pictorial representation of the nozzle of FIGS. 2 and 3 viewed from about the 4 o'clock position on FIG. 2 with portions cut away to show the internals.
Figure 5:
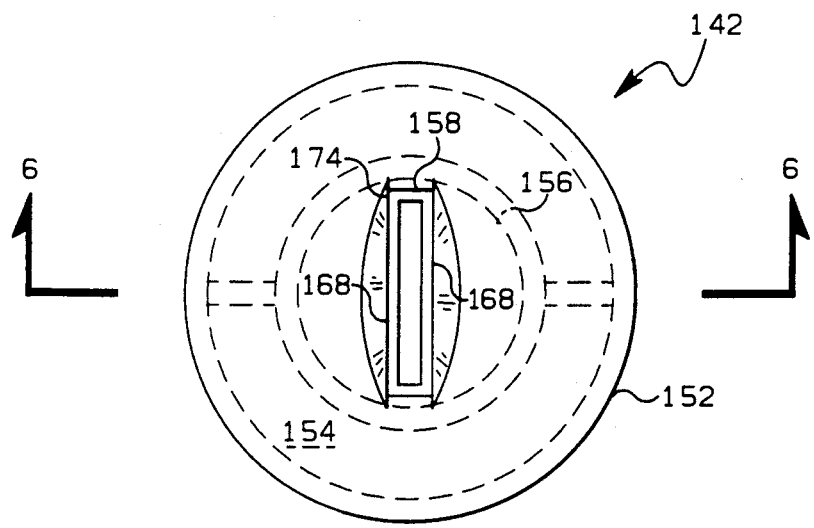
FIG. 5 is a plan representation of a nozzle useful in the system of FIG. 1.
Figure 6:
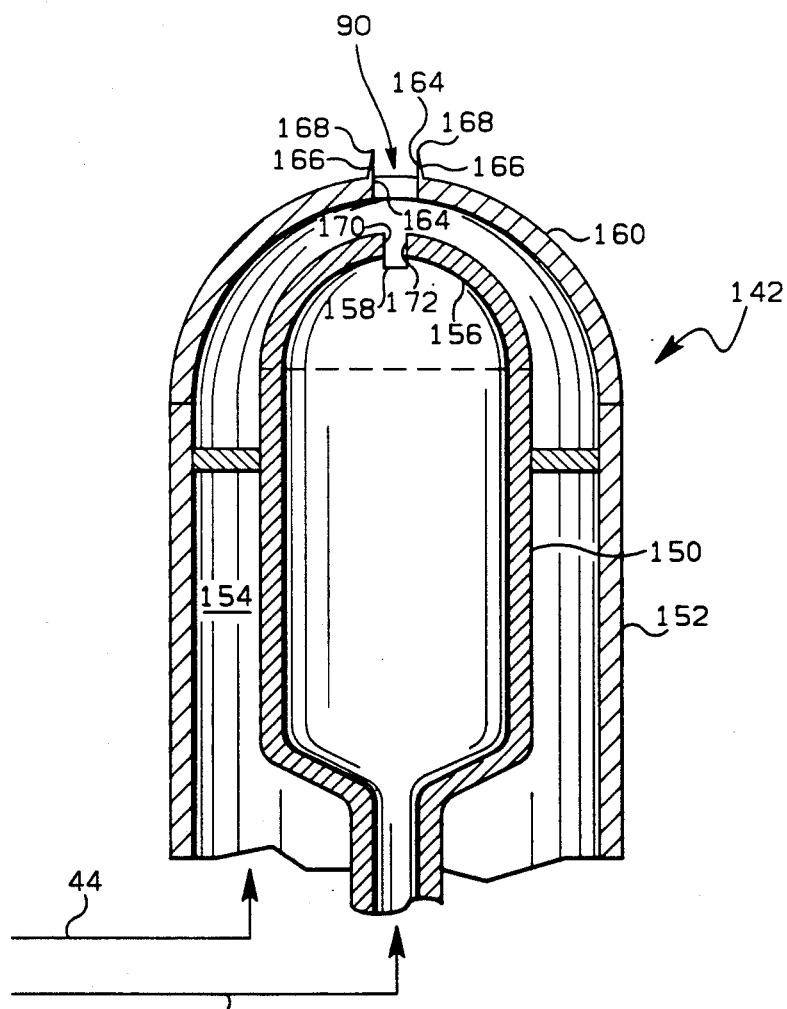
FIG. 6 is a cross-sectional view of the nozzle shown in FIG. 5 when viewed along lines 6—6.

The feedstock nozzle illustrated at 42 in FIG. 1 and also generally indicated as 42 in FIGS. 2, 3, and 4, and as 142 in FIGS. 5 and 6, is positioned in the lower part of riser-reactor 7. Referring now to FIGS. 2, 3, and 4, where like reference numerals are used for parts which appear in more than one figure, the feedstock nozzle 42 comprises an inner tubular member 50 and an outer tubular member 52.

Preferably, the tubular members 50 and 52 are concentrically positioned and thus an annular flow path 54 is defined between the inner tubular member 50 and the outer tubular member 52. A portion of the outer tubular member 52 protrudes past the discharge end of the inner tubular member 50. Preferably an end closure plate 56 for the inner tubular member is positioned on the discharge end of the inner tubular member 50. The inner tubular member end closure plate 56 has an elongated discharge slot 58 therethrough, preferably along a diameter of the inner tubular member 50, so as to discharge fluid in the form of a sheet flowing along the longitudinal tubular axis. An outer tubular member end closure plate 60 is positioned on the end of the protruding portion of the outer tubular member 52. The outer tube end closure plate 60, which is longitudinally spaced apart from the discharge end of the inner tubular member 50, defines an elongated discharge slot 62 between the upper surface of the discharge end closure plate 56 of the inner tubular member 50, and the bottom surface of the outer tube end closure 60, so as to discharge fluid in the form of a sheet flowing along the radius of the nozzle.

The outer tube end closure 60 includes an edge surface 64 which extends horizontally from the slot 62 to the perimeter of the outer tubular member 52. A projecting ridge or lip 66 is provided which extends the edge surface 64, away from the discharge end of the inner tubular member 50. Preferably, the ridge 66 terminates in a knife edge 68.

Preferably, the inner tubular member end closure slot 58 is defined by a first generally planar surface, or face, 70 and a second generally planar surface or face 72, with the faces 70 and 72 facing each other. The length of these faces defines the length of the slot, while the distance between them determines its width. Generally, the length:width ratio of the slot is in the range of 5 to 100. The edge surface or face 64 of the outer tubular member end closure 60 and a first side 74 of the ridge 66, when present, are preferably coplanar and will usually lie in about the same plane as, or preferably slightly set back from, the first generally planar surface 70 in the direction away from the slot 58. For good atomization, the edge 63, illustrated in FIG. 3, of the face 64 adjacent the slot 62 is sharp and formed from a hard material such as stellite. The face 64 can lean away from the longitudinal axis of the tubular member 50 to further sharpen edge 63 if desired. Edge 63 is preferably in or adjacent to the plane of planar surface 70.

It is further preferred that the slot 58 be oriented to emit a sheet of fluid orthogonally into a sheet of fluid emitted from the slot 62. However, where debris and the like may clog the oil flow passage through discharge slot 62, it can be desirable to flow the oil at a slant into the stream of steam through discharge slot 58 such as at an angle in the range of 60° to 30° with respect to the longitudinal tubular axis by setting end closure plate 60 at an angle with respect to the longitudinal axis and juxtaposing the end surface of plate 56.

Referring now specifically to FIG. 3, the source oil feed is connected to the nozzle 42 by the line 44. The oil carried by the line 44 empties into the annular space 54 between the inner tubular member 50 and the outer tubular member 52. The source of steam is connected via the line 47 flows in the inner tubular member 50 of the nozzle 42.

Referring now specifically to FIG. 1, the feed lines 44 and 47 which supply oil and steam respectively to the nozzle 42 are illustrated. Also illustrated is a tubular sheath 48 positioned around the outer tubular member 52 which is provided to prevent the nozzle 42 from being damaged by contact with the hot catalyst particles supplied through line 38. Another tubular member, which contains sheath 48 and the discharge end of the nozzle 42, defines the liftpot at the lower end of the riser-reactor 7. Further illustrated in FIG. 1, the regenerator 6 supplies hot cracking catalyst particles for the riser-reactor 7, and is connected to the liftpot via line 38 so that catalyst particles flow up the annular space between the tubular sheath member 48 and the tubular liftpot at the lower end of riser-reactor 7.

In the embodiment of the invention shown in FIGS. 2-4, the inner tube end closure 56 comprises a first plate having a slot 58 therethrough along the diameter of the inner tubular member 50, and the outer end closure 60 comprises a semicircular second plate 78 which is longitudinally spaced apart from the first plate portion. A third plate portion 80 which is generally annularly shaped and is preferably contiguous with the first plate 58, closes off the portion of the annular space 54 between the end closure plate 56 of the inner tubular member 50 and the outer tubular member opposite the semicircular-shaped second plate 78. A pair of side plates 82 and 84 connect the annularly-shaped plate portion 80 and the semicircular-shaped plate 78, preferably along a chord across the outer tubular member 52. The side plates 82 and 84 define the sides of the slot 62. The area ratio between the slot 62 and the slot 58 is usually in the range of from about 1:1 and about 10:1, preferably between about 2:1 and about 6:1 and depends on feed and steam conditions.

Referring now to FIG. 5 and FIG. 6, in a second embodiment of this invention, where all parts are given reference numberals having the prefix 100, the area ratio between both slots 162 and 158 is generally in the range of from about 1:1 to about 10:1, usually 2:1 to 5:1 when the length of the slots 162 is taken as the same as the length of slots 158. In this embodiment, the inner tube end closure 156 comprises an inner dome having a slot 158 therethrough and the outer tube end closure 160 comprises an outer dome having a slot 190 therethrough. A sharp edged ridge 168 can be positioned on each side of the slot 190 through the outer dome 160. The slot 190 and slot 158 are preferably in substantial longitudinal alignment. The area ratio between the slot 190 and the slot 158 is usually in the range of 2:1 and about 4:1.

It is very important to obtain good results in a catalytic cracking unit that the oil feed be in a vapor or fine mist at the time it admixes with the catalyst particles. According to certain aspects of the invention, the oil feed and atomizing gas are mixed by cutting or shearing a sheet of oil which can be emitted through the slot 62 or 162 with a stream, preferably a sheet of atomizing gas, usually steam, which can be emitted through the slot 58 or 158. The atomizing gas is preferably emitted from the nozzle in a direction parallel to the nozzle axis. A mixture of oil droplets dispersed in the atomizing gas is thus formed. The mixture is flowed by a nozzle face 64 or 164 which is oriented alongside the introduction of the sheet of steam. A protruding ridge, or so called lip, may be fixed along the edge of a discharge slot of the nozzle. By flowing the mixture of oil droplets dispersed in the atomizing gas past the lip which is mounted parallel to the nozzle face 64 or 164 and which protrudes away from the exterior surface of the nozzle face 164, coke buildup on the nozzle can be mitigated. Good results can be obtained where the lip has a side surface which is positioned so as to extend the nozzle face and the lip terminates in a sharp edge at the end of the side surface.

Optimal atomization can be obtained where the sheet of steam and the sheet of oil flow into each other in a generally orthogonal relationship. Good results are expected where the sheet of steam is caused to flow generally longitudinally with respect to the axis of the nozzle with oil flow being generally normal into the sheet of steam. The flow of oil through the nozzle is annular to the steam flow. The steam velocity through the steam slot is usually much higher than the oil velocity through the oil slot. Generally, steam velocity is between 1300 and 2000 feet per second, preferably at near sonic velocity, while oil velocity is between 5 and 50 feet per second. In one embodiment the mixture of oil droplets and atomizing gas is flowed between a pair of nozzle faces oriented juxtaposed to each other with a lip positioned on each face as an extension thereof. See FIGS. 5 and 6.

Exemplary dimensions and materials of construction of an oil nozzle as shown in FIGS. 2, 3, and 4 is illustrated in the following table:

TABLE

| Item | Exemplary Dimensions | Material of Construction |
|---|---|---|
| 50 | 2.875 in. O.D. pipe<br>2.125 in. I.D. pipe | 316 SS<br>(stainless steel) |
| 52 | 4.5 in. O.D. pipe<br>3.438 in. I.D. pipe | 316 SS |
| 54 | 0.282 in. open annulus between<br>3.438 in. I.D. pipe and 2.875 in.<br>O.D. pipe | — |
| 56 | 0.5 in. thick plate fitting over<br>segmental section of outer pipe<br>and over end of inner pipe | 316 SS |
| 58 | 1/16 in. hardfaced slot across<br>midsection of inner pipe with<br>⅛ in. thick hardfaces | Stellite #1<br>slot facing |
| 62 | 0.282 in. height × 2.125 in. width<br>slot opening to discharge feed oil<br>perpendicularly to steam slot 58 | — |
| 64 | ⅛ in. hardface facing on end and<br>side of oil exit nozzle edge of<br>⅛ in. × 4.5 in | Stellite #1 |
| 66 | ⅛ in. × ⅛ in. × 4.5 in. triangular<br>ridge made of hardfacing welded to<br>segmental plate 60 and integral within<br>edge 64 | Stellite #1 |
| 70, 72 | Planar surfaces or faces made of<br>⅛ in. hardface, each face about<br>2.125 in. in length | Stellite #1 |
| 74 | Side hardfaced ⅛ in. thick with same<br>dimension as 64 or ⅛ in. × 4.5 in. | Stellite #1 |
| 78 | ⅛ in. thick segmental plate welded<br>on of outer pipe with segment face<br>parallel with steam slot of inner pipe | 316 SS |
| 80 | ⅛ in. thick plate annular by segment<br>shape welded on end of pipe 52 but<br>segment is horizontally cut to inner<br>pipe 50 | 316 SS |

TABLE-continued

| Item | Exemplary Dimensions | Material of Construction |
|---|---|---|
| 82, 84 | two plates 0.282 in. height × 1.1875 in. width each with ¼ in. hardened steel inner faces | 316 SS plated w/Stellite #1 |

That which is claimed is:

1. In a fluidized catalytic cracking process, an improved method of injecting an oil feed stream into a hot fluidized bed of cracking catalyst particles in a reactor comprises the following steps:

maintaining oil cracking conditions in the reactor;
   introducing the oil feed stream and an atomizing gas stream into the reactor through a nozzle extending inside the reactor, the nozzle having a first and a second flow path and corresponding first and second outlets, wherein the second flow path is an annular flow path surrounding the first flow path;
   providing a protective sheating positioned around the portion of the nozzle extending inside the reactor;
   flowing the atomizing gas feed stream in the first flow path and flowing the oil feed stream in the second flow path;
   forming the oil feed stream into at least one sheet discharged from the second outlet, and forming the atomizing gas stream into at least one sheet discharged from the first outlet;
   breaking down the at least one sheet of oil by shearing the at least one sheet of oil with the at least one sheet of atomizing gas so as to form a mixture of oil droplets dispersed in the atomizing gas; and
   directing the mixture of oil droplets dispersed in the atomizing gas into the hot fluidized bed of cracking catalyst in the reactor.

2. A method in accordance with claim 1, wherein the atomizing gas comprises steam.

3. A method in accordance with claim 2, wherein the nozzle comprises a generally cylindrical component, and wherein the step of breaking down the at least one sheet of oil comprises:

flowing the sheet of steam generally longitudinally with respect to the longitudinal axis of the nozzle; and
   flowing the sheet of oil generally normally into the sheet of steam.

4. A method in accordance with claim 3, wherein the step of flowing the sheet of steam generally longitudinally with respect to the longitudinal axis of the nozzle comprises:

providing a first end closure plate having a first discharge slot therethrough connected to the first outlet, wherein the first end closure is generally circular and the first discharge slot is positioned along a diameter of the first end closure; and
   flowing the steam feed stream through the first discharge slot.

5. A method in accordance with claim 4, wherein the step of flowing the sheet of oil generally normally into the sheet of steam comprises:

providing a second end closure plate connected to the second outlet, the second end closure having a sidewall section adjacent to and extending past the first discharge slot, the sidewall having a projecting ridge and a second discharge slot is juxtapose arrangement with the first discharge slot; and
   flowing the oil feed stream through the second discharge slot.

6. A method in accordance with claim 5 wherein the step of directing the mixture of oil droplets dispersed in the atomizing gas into the hot fluidized bed of cracking catalyst comprises:

discharging the mixture of oil droplets dispersed in the sheet of steam across the projecting ridge.

* * * * *